F. G. BREUL.
METHOD OF SHAPING WIRE ENDS.
APPLICATION FILED JAN. 24, 1914.
1,164,254. Patented Dec. 14, 1915.
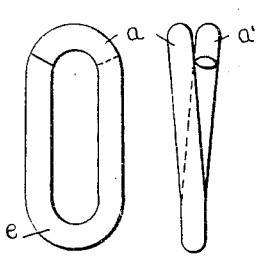
Fig.1  Fig.2
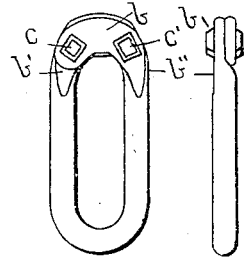
Fig.3  Fig.4
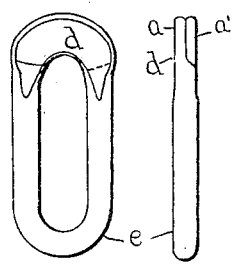
Fig.5  Fig.6
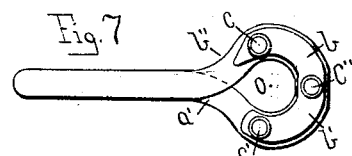
Fig.7
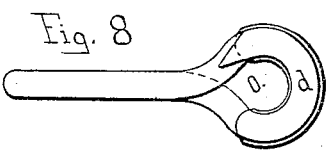
Fig.8
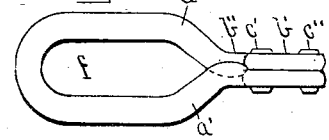
Fig.9
Fig.10
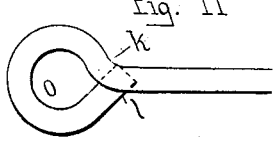
Fig.11
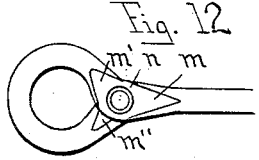
Fig.12
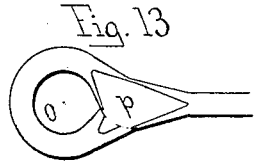
Fig.13
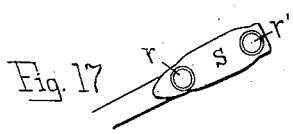
Fig.14
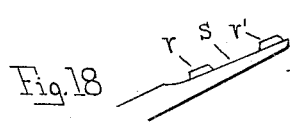
Fig.15
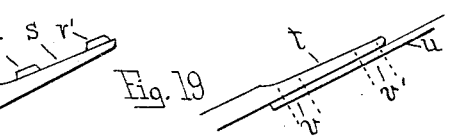
Fig.16    Fig.17    Fig.18    Fig.19
WITNESSES:
F. W. Niemes.
Stephen Masek
INVENTOR
Frederick G. Breul.

UNITED STATES PATENT OFFICE.

FREDERICK G. BREUL, OF BRIDGEPORT, CONNECTICUT.

METHOD OF SHAPING WIRE ENDS.

1,164,254. Specification of Letters Patent. Patented Dec. 14, 1915.

Application filed January 24, 1914. Serial No. 814,123.

*To all whom it may concern:*

Be it known that I, FREDERICK G. BREUL, a citizen of the United States, residing at Bridgeport, in the county of Fairfield and State of Connecticut, have invented a new and useful method of shaping wire ends and links provided with coinciding wire ends in a manner to laterally weld such overlapping wire ends and link portions properly and advantageously.

Up to the present date no rapid and practically useful method is known for properly welding together coinciding, overlapping wire ends of certain chain links, at present manufactured in large quantities by automatic machinery. To unite two pieces of weldable metal, in this case the overlapping wires, by any other as well as by the lateral electric process employed by me, quite an amount of material must be allowed and properly placed for compression by the electrodes, and certain resistance must be provided against a free, unobstructed flow of the fluid metal outwardly and away from such a welding joint in the act of formation. Without such provisions either improperly welded, or unsightly shaped links with irregular, sharp and rough fashes on both sides of the welded portion are obtained.

By my present method I have overcome these difficulties and obstacles and am producing securely welded, well shaped and useful links, chain, rings and eyes on wire rods, etc., by the herein described rapid and cheap process.

In the drawings Figure 1, represents a plan view and Fig. 2 a side view of a common oval or split link as formed by the bending tools only, Figs. 3 and 4 are same class of views of such link after the overlapping end bows are swaged according to my present method, and Figs. 5 and 6 are like views of same link after having been electrically welded. Figs. 7 and 9 are front and side views of another kind of link in which the overlapping wire ends are also treated according to my method, to be electrically welded and thereafter to appear like the finished link shown by plan view 8 and side view 10. The manner in which I form and weld an end eye on a wire rod is shown next in the drawings, Figs. 11 and 14 representing a front and a side view of an eye formed by bending tools, Figs. 12 and 15 show like views of such an eye swaged according to my method and Figs. 13 and 16 are such views of a welded and completed link eye. Figs. 17 and 18 show how a wire end may be swaged and Fig. 19 how it will appear when welded to sheet metal.

The different stages of my method for forming and welding chain links having overlapping end bows are represented in the first set of drawings. Figs. 1 and 2 of these show a link shaped by bending tools from a length of wire, an operation which does not differ materially from the one at present in use for making such links and chain.

By the next operation, illustrated in Figs. 3 and 4, however I prepare such links according to my aim and improvement, so that a sufficient portion of the overlapping wires may be positively and securely welded, that furthermore only certain, well defined, central portions of the flattened, coinciding wires are receiving the welding currents, and the material outside thereof made only just hot and pliable enough to recede outwardly to accommodate the reception of the fluid metal pressed inwardly by the advancing electrode. The manner in which I accomplish this consists in swaging certain portions of the overlapping wire ends into the shape and size proper for such part of a finished link, at the same time also giving the body part of the link its ultimate correct form, while certain protuberances, located directly opposite each other on the surfaces of both overlapping wires, are simultaneously formed thereon, thereafter to be acted upon by a lateral electrical welding process and to be reduced thereby to the surfaces and levels of the completely swaged portion.

It will be observed by referring to Fig. 4, the side view of a swaged link, that such swaging operation was performed on a previously bent link between two flat dies. Both these have properly located cavities for the production of protuberances like *c* and *c'*, see Figs. 3 and 4, on the flat swaged surfaces on both sides of the overlapping wire portion. As usual in such operations, a plate having an aperture of approximately the shape and size of a swaged link is secured to the lower die for the purpose of properly locating links thereon.

When a link, prepared according to Figs. 3 and 4, is introduced between and acted on by flat faced electrodes, a welding current immediately passes through protuberance or teat *c* and the opposite one of the rear thereof, and another current passes through teat *c'* and the rear one in line therewith. It is plain, that the metal in the line of these currents is instantly brought to a welding heat and all the material contained in the teats is forced inward by mechanical pressure of the electrodes, until their faces touch the swaged surfaces 1 and the one in rear thereof. At this stage the electrodes come to a pronounced rest and are quickly retracted, to prevent any unnecessary use or loss of electricity and to preserve intact the general shape and size of the overlapping and swaged wire portion. As the metal contained in the teats is being heated, compressed and forced inwardly, absolutely perfect welding joints are produced between the overlapping wires in the line of the currents passing into and through the teats. The heated, but not molten metal on each side of the teats is forced both outwardly and along the wire ends to make room for the reception of the material forced inwardly, as described. The welding operation being accomplished, a finished solid link of the appearance shown in Figs. 5 and 6 is produced.

A link of the description illustrated in Figs. 8 and 10 is prepared for the welding operation in a similar manner, as shown in Fig. 7, a front view, and in Fig. 9, the side view of such a swaged link. It is shown in Fig. 7 how three sets of teats may be employed if desirable, the central one, *c''*, dividing the flattened surface in two portions, *b* and *b'*, the rear face of the double eye of the link being shaped likewise. The welding operation is performed in the same manner, with like electrodes and action of currents, as for the previously described link. It is apparent on consideration of the welded and finished link, Figs. 8 and 10, that a stronger and smoother, as well as a much lighter one is obtained in the manner described and illustrated, than such links of usual form and manufacture, which have the wire ends extended farther along and hooked around the shank wires *a* and *a'*.

The next thing shown in the drawings refers to the production of a welded eye on one or both ends of a wire. Figs. 11 and 14 show how such an eye may be formed by bending tools, and Figs. 12 and 15 illustrate the appearance of such a link when acted on by the swaging operation, by which each face of the eye receives a continuous surface divided in more or less pronounced flattened places *m*, *m'* and *m''*, which inclose teat *n*, all as denoted on the front face thereof, in Fig. 12. Electrodes with slightly convex faces are employed for the welding operation in this case, so as to produce slightly concave surfaces like *p*, Figs. 13 and 16, on the front and rear faces of the eyes upon the elimination of the teats therein.

My method may furthermore be of good service for the purpose of welding one or both ends of wire handles to cooking utensils or similar objects or tools. A wire end properly prepared for such purpose is shown in Figs. 17 and 18. As seen therein, the wire is preferably flattened wedge shape toward the end, and only on the upper flat surface *s*, and some distance apart in the direction of the wire line, teats *r* and *r'* are contained as described above for action and reduction by the welding currents.

The opposite or lower surface of the wire end is formed to correspond to the shape of the surface to which it is to be attached by welding. The electrodes, which have slightly converging operative faces corresponding to the tapering wire end, press together a selected and properly located plate or other article and the prepared end of a wire to be welded thereon, when currents immediately pass through the teats, and heat to a welding point the material in line of such currents. As already described, the melting material in the teats is forced into the material below the surface on which they are located, and the electrodes are retracted instantly as soon as the forward movement of the advancing upper one is arrested by striking the wire surface. The teats having thus been disposed of, this upper surface becomes continuous, as denoted by *t*, Fig. 19, the swaged part thereof, see *s*, Figs. 17 and 18 remaining unaffected by the welding operation and unaltered, while the wire end and plate *u* are securely welded together in the lines of activity of the welding currents, in the spaces *v* and *v'* shown located between parallel, dotted lines.

By the foregoing it is evident that I have achieved my object, that I obtain substantially welded, well formed and serviceable links, and do the welding operation more economically, quicker and in a perfectly dependable and uniform manner, by using strong, concentrated currents and by bringing the advancing electrodes to a sufficiently noticeable stop at the completion of the welding operations, so that they may be instantly retracted and the properly finished link released. Any number of such chain links as described may be acted on in rotation, if connected together before the welding operation to form a length of chain.

I claim:

1. The method of shaping and welding wires, such method consisting in overlapping and swaging the wire ends in a manner to flatten and broaden them, while providing their exterior flat surfaces with raised portions not affected by the flattening process, said raised portions receiving welding currents thereafter, producing localized welds of the wire ends of the dimensions of said raised portions.

2. The method of shaping and welding overlapping ends of wire links and the like, consisting in the flattening of, and in simultaneously forming teats opposite to each other, on both exterior surfaces of such overlapping wire ends by means of a cold swaging operation, said teats then subjected to welding currents, heating and forcing them into the melting material beneath, the welding operation being completed and checked at the point of disappearance of the teats within the flattened surfaces.

3. The method of shaping and welding overlapping end portions of wire links, consisting of reducing such overlapping portions in a manner to leave certain defined parts thereof unaffected by such operation and of the original thickness, such parts appearing in the form of teats, located on opposite flat surfaces and in line with each other, heating said teats by welding currents, and pressing said teats into the plastic metal below and between the teats until they are level with said flat surfaces, thereby welding said overlapping end portions together over areas corresponding to said teats.

FREDERICK G. BREUL.

Witnesses:
F. W. NIEMES,
STEPHEN MASEK.

Copies of this patent may be obtained for five cents each, by addressing the "Commissioner of Patents, Washington, D. C."